US012638369B2

(12) United States Patent
Zhang et al.

(10) Patent No.: US 12,638,369 B2
(45) Date of Patent: May 26, 2026

(54) SYSTEM FOR TESTING FATIGUE PERFORMANCE OF MATERIAL IN LOW-TEMPERATURE LIQUID HYDROGEN ENVIRONMENT

(71) Applicant: EAST CHINA UNIVERSITY OF SCIENCE AND TECHNOLOGY, Shanghai (CN)

(72) Inventors: Xiancheng Zhang, Shanghai (CN); Shantung Tu, Shanghai (CN); Liqiang Liu, Shanghai (CN); Jianping Tan, Shanghai (CN); Binhan Sun, Shanghai (CN); Junmiao Shi, Shanghai (CN); Runzi Wang, Shanghai (CN); Ji Wang, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 396 days.

(21) Appl. No.: 18/574,682

(22) PCT Filed: Mar. 29, 2023

(86) PCT No.: PCT/CN2023/084752
§ 371 (c)(1),
(2) Date: Dec. 27, 2023

(87) PCT Pub. No.: WO2023/185939
PCT Pub. Date: Oct. 5, 2023

(65) Prior Publication Data
US 2024/0295477 A1 Sep. 5, 2024

(30) Foreign Application Priority Data
Apr. 2, 2022 (CN) .......................... 202210349879.5

(51) Int. Cl.
*G01N 3/08* (2006.01)

(52) U.S. Cl.
CPC ....... *G01N 3/08* (2013.01); *G01N 2203/0069* (2013.01); *G01N 2203/0228* (2013.01)

(58) Field of Classification Search
CPC ............ G01N 3/08; G01N 2203/0069; G01N 2203/0228; G01N 3/32; G01N 3/02; G01N 2203/0073
See application file for complete search history.

(56) References Cited

U.S. PATENT DOCUMENTS 6,935,187 B1 * 8/2005 Gorman ................... G01N 3/32
73/811
2003/0113545 A1 * 6/2003 Mitani ..................... C08J 5/243
428/413

FOREIGN PATENT DOCUMENTS

CN 103439201 A * 12/2012
CN 109297804 B * 1/2021 ............. F25D 17/02
(Continued)

*Primary Examiner* — Francis C Gray
(74) *Attorney, Agent, or Firm* — CM Law PLLC; Aasheesh Shravah

(57) ABSTRACT

A system for testing fatigue performance of material in low-temperature liquid hydrogen environment, which relates to the technical field of mechanical property test platforms, includes a jacket cover. A hydrogen sensor is provided at the top of and within the jacket cover; a rack, a liquid hydrogen tank and a liquid nitrogen tank are provided in the jacket cover; a loading mechanism and a liquid hydrogen containing mechanism are provided on the rack, the loading mechanism is connected to the rack, and the bottom of the loading mechanism extends into the liquid hydrogen containing mechanism; the liquid hydrogen tank and the liquid nitrogen tank both communicate with the liquid hydrogen containing mechanism; and the loading mechanism is configured for providing tension or pressure to a sample. The liquid hydrogen containing mechanism is (Continued)

provided with a cooling channel located around a sealing gasket, the cooling channel communicates with a thermostat.

8 Claims, 3 Drawing Sheets

(56)                    References Cited

FOREIGN PATENT DOCUMENTS

| | | | | | |
|----|-------------|----|---------|-----------|-----------|
| CN | 215115496 U | *  | 12/2021 |           |           |
| CN | 215260683 U | *  | 12/2021 |           |           |
| CN | 110411875 B | *  | 2/2022  | ............. | G01F 23/00 |
| RU | 2756169 C1  | *  | 9/2021  | ............. | B64G 99/00 |

* cited by examiner

SYSTEM FOR TESTING FATIGUE PERFORMANCE OF MATERIAL IN LOW-TEMPERATURE LIQUID HYDROGEN ENVIRONMENT

CROSS-REFERENCE TO RELATED APPLICATION

This application is a national stage application of International Patent Application No. PCT/CN2023/084752, filed on Mar. 29, 2023, which claims the priority of Chinese Patent Application No. 202210349879.5 entitled "LOW-TEMPERATURE LIQUID HYDROGEN ENVIRONMENT MATERIAL FATIGUE PERFORMANCE TEST SYSTEM" filed with the Chinese Patent Office on Apr. 2, 2022, which is incorporated herein by reference in its entirety.

TECHNICAL FIELD

The present disclosure relates to the technical field of mechanical property test platforms, in particular to a system for testing fatigue performance of material in low-temperature liquid hydrogen environment.

BACKGROUND

Hydrogen energy considered as a promising secondary energy source can be obtained through primary energy, secondary energy and industrial fields, and has the advantages of clean, low carbon, high calorific value and high conversion rate. The characteristics of hydrogen energy such as large reserve volume, zero pollution and high efficiency will become key points in building a diversified energy system in China. However, when structural metals have been working in hydrogen environment for a long time, hydrogen embrittlement inevitably appears, resulting in the decline of mechanical properties and the reduction of service life of metals. Great potential safety hazards are caused to the transportation and storage of hydrogen energy, and the application and popularization of hydrogen energy are seriously restricted.

In order to ensure the safe and reliable operation of hydrogen energy equipment, it is necessary to test and evaluate the mechanical properties of metal materials in hydrogen environment. At present, there are many material fatigue performance test systems in hydrogen environment, and the fracture toughness, yield strength and fatigue performance of materials are involved. However, most of these systems use liquid helium as a refrigerant, so that the system is complex and high in cost. In addition, in the mechanical property test system of materials in hydrogen environment, under the immersion of the low-temperature refrigerant, the joint of a metal pipe and a flange is easy to expand with heat and contract with cold to result in hydrogen leakage, and test accidents are easy to cause.

SUMMARY

The present disclosure provides a system for testing fatigue performance of material in low-temperature liquid hydrogen environment, and aims to solve the technical problem of testing the material fatigue performance in a low-temperature liquid hydrogen environment in the prior art.

In order to achieve the purpose, the present disclosure provides the following scheme.

The present disclosure provides a system for testing fatigue performance of material in low-temperature liquid hydrogen environment. The system includes a jacket cover, where a hydrogen sensor is provided at a top of and within the jacket cover; a rack, a liquid hydrogen tank and a liquid nitrogen tank are provided in the jacket cover; a loading mechanism and a liquid hydrogen containing mechanism are provided on the rack, a top of the loading mechanism is connected to a top of the rack, and a bottom of the loading mechanism extends into the liquid hydrogen containing mechanism; the liquid hydrogen tank and the liquid nitrogen tank both communicate with the liquid hydrogen containing mechanism; the liquid hydrogen tank and the liquid nitrogen tank are respectively configured for providing liquid hydrogen and liquid nitrogen; and the loading mechanism is configured for providing tension or pressure to a sample.

Optionally, the rack includes a bottom plate, an upright post, an upper stand and a middle stand; a bottom end of the upright post is connected to the bottom plate, the upper stand is arranged at a top of the upright post, and the middle stand is arrange at a middle or lower part of the upright post; and the loading mechanism is connected to the upper stand, and the liquid hydrogen containing mechanism is arranged on the middle stand.

Optionally, the loading mechanism includes a power assembly and a loading assembly; the sample is arranged in the loading assembly; the power assembly is configured for driving the loading assembly; and the power assembly is connected to the rack.

Optionally, the power assembly includes a motor, a speed reducer, a bearing, a pillar, a bearing seat, a support cylinder, a pull tube, a connecting shaft, a nut, a fastening screw, a ball screw and a shaft sleeve; an output shaft of the motor is connected to an input end of the speed reducer, and an output end of the speed reducer is connected to a top of the ball screw through the shaft sleeve; the pillar is arranged between a shell of the speed reducer and the top of the rack; the nut is arranged on the ball screw, a limit sleeve is arranged outside the nut, the limit sleeve is configured for preventing the nut from rotating without limiting an up-and-down movement of the nut, and the limit sleeve and the top of the rack are connected to each other through the fastening screw; the bearing seat is arranged at a top of the limit sleeve, the bearing is arranged in the bearing seat, and an inner ring of the bearing sleeves a top end of the ball screw.

Optionally, the loading assembly includes a sealing gasket, a reaction frame, a universal pad, a base, a backlash ring, a lower chuck, a sample, an upper chuck, a dynamic sealing structure and a loading rod; a top end of the loading rod is connected to the power assembly, and a bottom end of the loading rod extends into the liquid hydrogen containing mechanism and is connected with the upper chuck; the dynamic sealing structure is arranged between a middle part of the loading rod and the liquid hydrogen containing mechanism; the reaction frame is arranged below a top of and within the liquid hydrogen containing mechanism, a bottom of the reaction frame is provided with a support plate, a bottom of the lower chuck penetrates through the support plate and is connected with the base, and the universal pad is arranged between the base and the bottom of the lower chuck; the backlash ring is arranged between a top of the lower chuck and an upper surface of the support plate; and the sample is arranged between the upper chuck and the lower chuck.

Optionally, the liquid hydrogen containing mechanism includes a cover plate, a liquid hydrogen channel, a heat preservation channel and legs; the legs are arranged at a bottom of the heat preservation channel, the liquid hydrogen channel is arranged in the heat preservation channel, and the liquid hydrogen channel communicates with the liquid hydrogen tank; an accommodating space is formed between an outer wall of the liquid hydrogen channel and an inner wall of the heat preservation channel, and the accommodating space communicates with the liquid nitrogen tank for containing the liquid nitrogen; and the cover plate is arranged at a top of the liquid hydrogen channel.

Optionally, a thermostat, where the cover plate and the liquid hydrogen channel are provided with cooling channels located around the sealing gasket, and the thermostat communicates with the cooling channels.

Optionally, the system further includes a thermostat, where the cover plate and the liquid hydrogen channel are provided with cooling channels located around the sealing gasket, and the thermostat communicates with the cooling channels.

Compared with the prior art, some embodiments have the following technical effects.

According to the system for testing fatigue performance of material in low-temperature liquid hydrogen environment in some embodiments, the liquid hydrogen containing mechanism is provided with the cooling channels located around the sealing gasket. The cooling channels communicate with the thermostat, and the temperature around the sealing gasket is maintained by means of the thermostat, so as to prevent the sealing gasket from failing due to the temperature being too low, thereby preventing hydrogen leakage. The jacket cover is used to ensure test safety when hydrogen gas leaks, the hydrogen sensor is used to monitor whether hydrogen gas leaks, and, if leakage occurs in the test, the gas in the jacket cover may be discharged to a specific environment.

BRIEF DESCRIPTION OF THE DRAWINGS

In order to more clearly illustrate technical solutions in the embodiments of the present application or in the prior art, a brief introduction to the accompanying drawings required for the embodiment will be provided below. Obviously, the accompanying drawings in the following description are only some of the embodiments of the present disclosure. Those of ordinary skill in the art would also be able to derive other drawings from these drawings without making creative efforts.

REFERENCE SIGNS IN ATTACHED FIGURES

1 loading mechanism; 2 liquid hydrogen containing mechanism; 3 hydrogen sensor; 4 jacket cover; 5 liquid hydrogen tank; 6 liquid nitrogen tank; 7 rack; 8 thermostat; 9 motor; 10 speed reducer; 11 bearing; 12 pillar; 13 bearing seat; 14 support cylinder; 15 pull tube; 16 connecting shaft; 17 nut; 18 fastening screw; 19 ball screw; 20 shaft sleeve; 21 loading mechanism assembly; 23 cover plate; 24 sealing gasket; 25 reaction frame; 26 universal pad; 27 base; 28 backlash ring; 29 lower chuck; 30 sample; 31 upper chuck; 32 dynamic sealing structure; 33 loading rod; 34 liquid hydrogen channel; 35 heat preservation channel; 36 liquid nitrogen; 37 leg; 38 upper stand; 39 upright post; 40 bottom plate; 41 middle stand; and 42 lock nut.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments of the present invention, all other embodiments obtained by those of ordinary skill in the art without creative work shall fall within the protection scope of the present invention.

Figure 1:
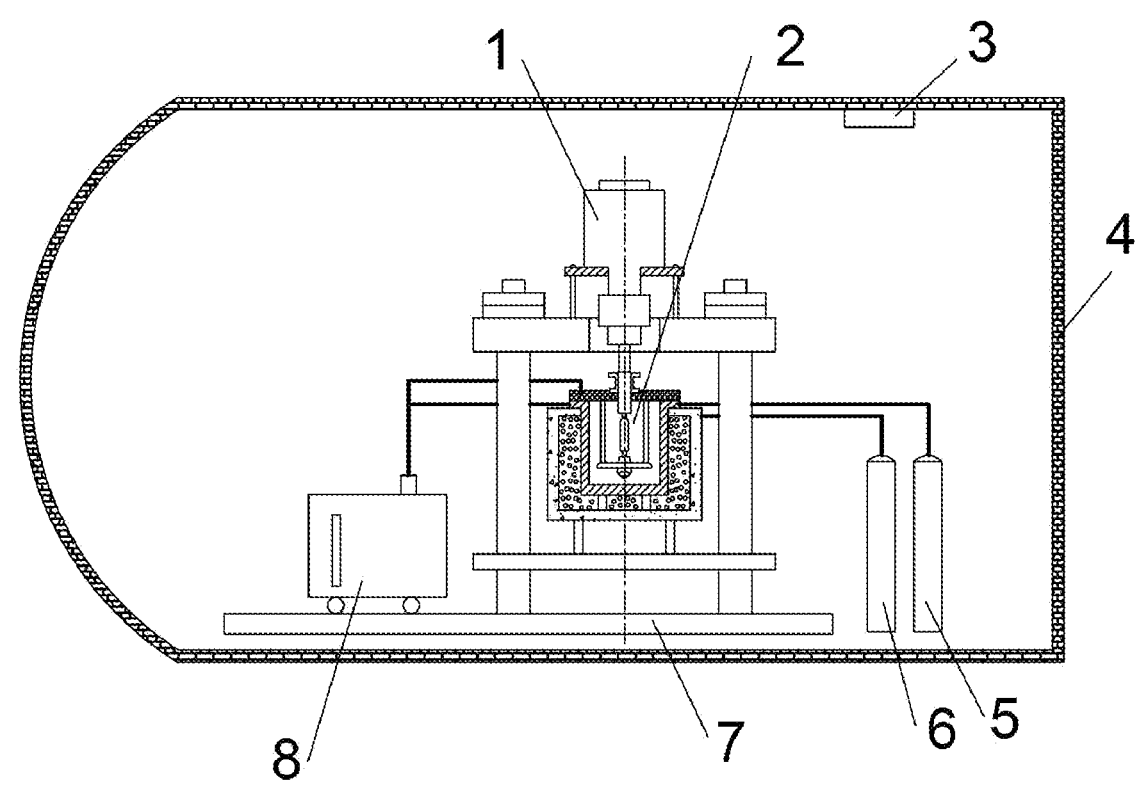
FIG. 1 is a structural schematic diagram of a system for testing fatigue performance of material in low-temperature liquid hydrogen environment in the present disclosure.
Figure 2:
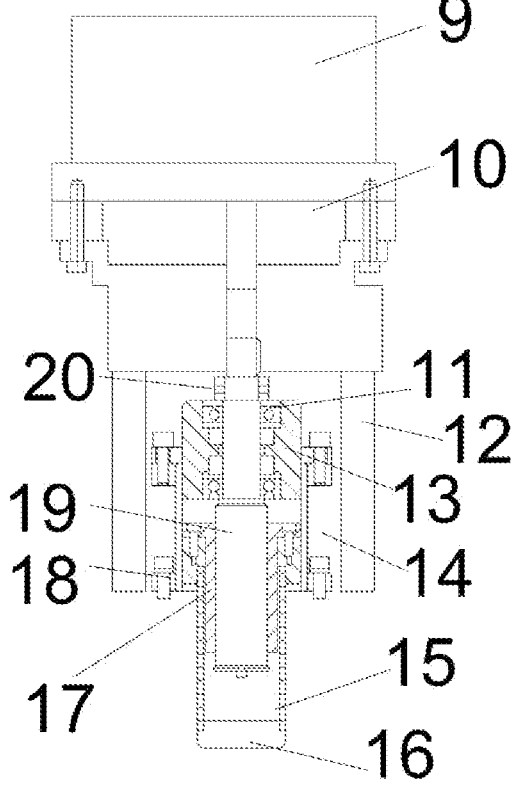
FIG. 2 is a structural schematic diagram of a power assembly in a system for testing fatigue performance of material in low-temperature liquid hydrogen environment in the present disclosure.
Figure 3:
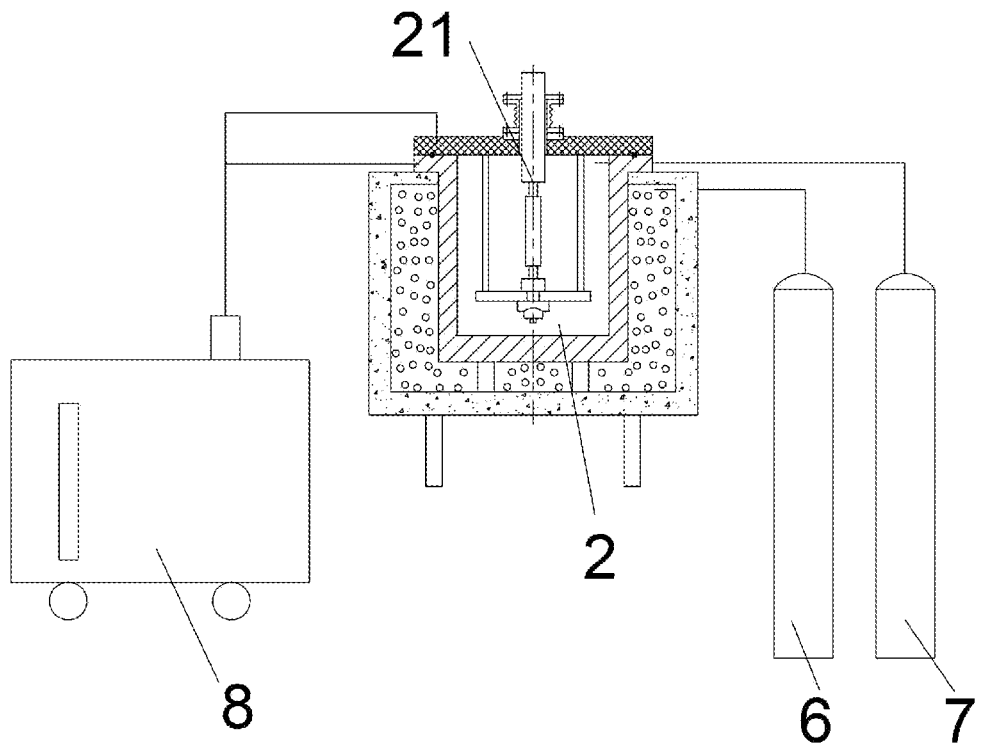
FIG. 3 is a structural schematic diagram of a loading assembly and a liquid hydrogen containing mechanism in a system for testing fatigue performance of material in low-temperature liquid hydrogen environment in the present disclosure.
Figure 4:
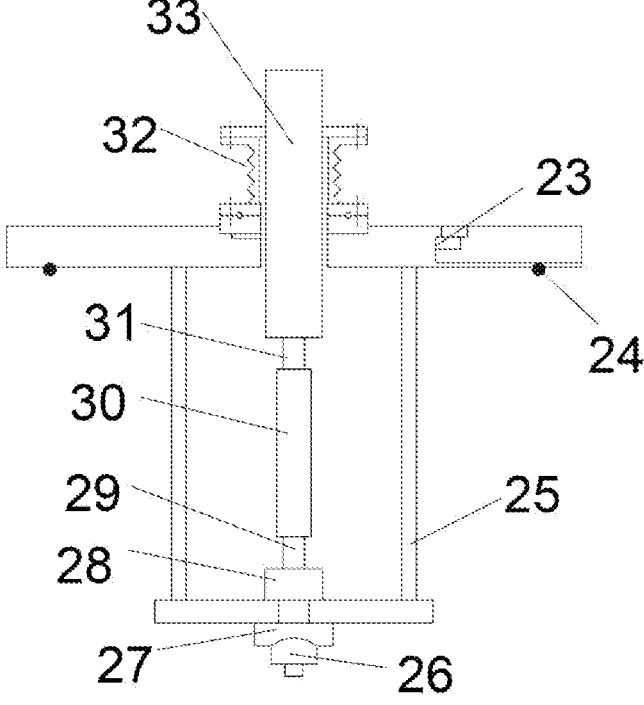
FIG. 4 is a structural schematic diagram of a loading assembly in a system for testing fatigue performance of material in low-temperature liquid hydrogen environment in the present disclosure.
Figure 5:
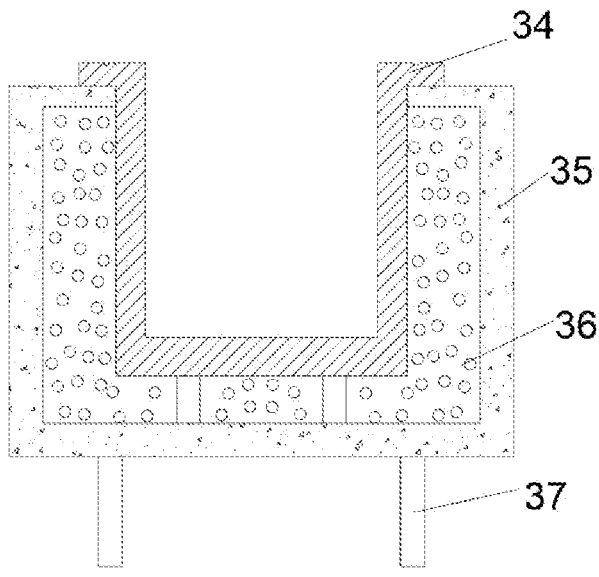
FIG. 5 is a structural schematic diagram of a liquid hydrogen containing mechanism in a system for testing fatigue performance of material in low-temperature liquid hydrogen environment in the present disclosure.
Figure 6:
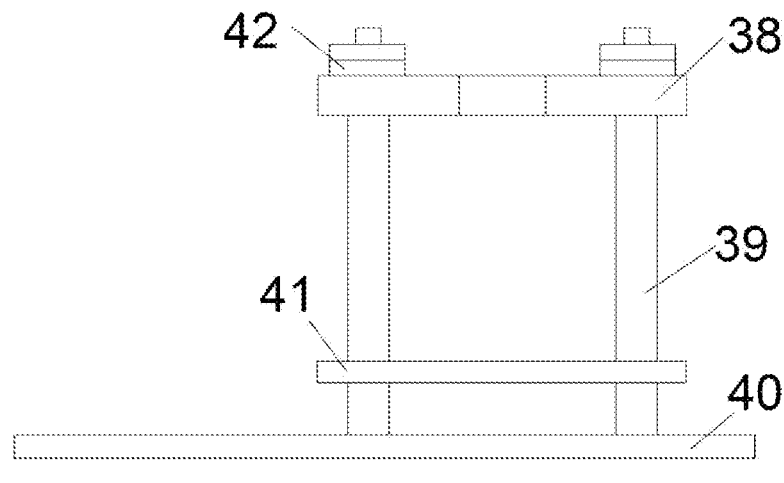
FIG. 6 is a structural schematic diagram of a rack in a system for testing fatigue performance of material in low-temperature liquid hydrogen environment in the present disclosure.
Figure 7:
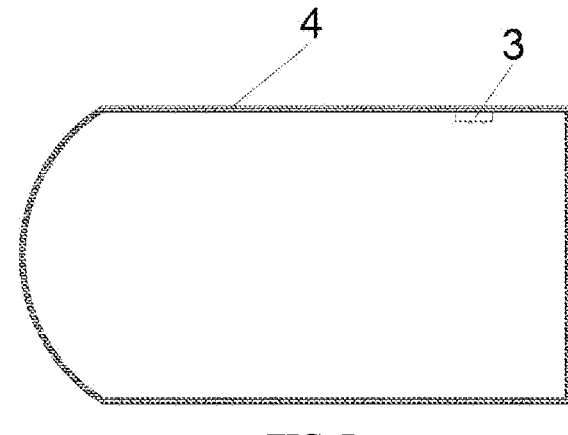
FIG. 7 is a structural schematic diagram of a jacket cover in a system for testing fatigue performance of material in low-temperature liquid hydrogen environment in the present disclosure.

As shown in FIG. 1 to FIG. 7, the embodiment provides a system for testing fatigue performance of material in low-temperature liquid hydrogen environment. The system includes a jacket cover 4. A hydrogen sensor is provided at a top of and within the jacket cover 4. A rack 7, a liquid hydrogen tank 5 and a liquid nitrogen tank 6 are provided in the jacket cover 4. A loading mechanism 1 and a liquid hydrogen containing mechanism 2 are provided on the rack 7, a top of the loading mechanism 1 is connected to a top of the rack 7, and a bottom of the loading mechanism 1 extends into the liquid hydrogen containing mechanism 2. The liquid hydrogen tank 5 and the liquid nitrogen tank 6 both communicate with the liquid hydrogen containing mechanism 2. The liquid hydrogen tank 5 and the liquid nitrogen tank 6 are respectively configured for providing liquid hydrogen and liquid nitrogen 36. The loading mechanism 1 is configured for providing tension or pressure to a sample 30.

Because of low density of hydrogen, the hydrogen sensor is fixed at the top of the jacket cover 4, so that the presence of hydrogen can be sensitively detected.

The rack 7 is configured for providing support in the experiment, and the stiffness of the rack 7 should be ensured to ensure that the deformation of the sample 30 during the test should be much less than the deformation of the system of the rack 7. Specifically, the rack 7 includes a bottom plate 40, upright posts 39, an upper stand 38 and a middle stand 41. Bottom ends of the upright posts 39 are connected to the bottom plate 40, the upper stand 38 is arranged at a top of the upright post 39, and the middle stand 41 is arrange at a middle or lower part of the upright post 39. The loading mechanism 1 is connected to the upper stand 38, and the liquid hydrogen containing mechanism 2 is arranged on the middle stand 41. In the embodiment, the bottom plate 40 is a rectangular plate. Four upright posts 39 are arranged at the middle and one end of the bottom plate 40. The top of the upright post 39 is smaller in diameter and is provided with a thread. The upper stand 38 sleeves the part with smaller diameter of the upright post 39 and fixed by a lock nut 42. The middle stand 41 is located at the middle or lower parts of the upright posts 39 and welded and connected with the upright posts 39. The middle stand 41 serves as a bearing platform of the liquid hydrogen containing mechanism 2. The upper stand 38 serves as a mounting platform of the loading mechanism 1. Besides supporting the upright posts 39, the bottom plate 40 is configured for accommodating the thermostat 8 from the middle to the other end of the bottom plate 40.

The loading mechanism 1 is configured for providing load born by materials in a liquid hydrogen service environment, and specifically includes a power assembly and a loading assembly 21. The sample 30 is arranged in the loading assembly 21. The power assembly is configured for driving the loading assembly 21. The power assembly is connected to the rack 7. The power assembly includes a motor 9, a speed reducer 10, a bearing 11, a pillar 12, a bearing seat 13, a support cylinder 14, a pull tube 15, a connecting shaft 16, a nut 17, a fastening screw 18, a ball screw 19 and a shaft sleeve 20. An output shaft of the motor 9 is connected to an input end of the speed reducer 10, and an output end of the speed reducer 10 is connected to a top of the ball screw 19 through the shaft sleeve 20. The pillar 12 is arranged between a shell of the speed reducer 10 and the top of the rack 7. The nut 17 is arranged on the ball screw 19. A limit sleeve is arranged outside the nut 17. The limit sleeve is configured for preventing the nut 17 from rotating but not limiting an up-and-down movement of the nut 17. The limit sleeve and the top of the rack 7 are connected to each other through the fastening screw 18. The bearing seat 13 is arranged at a top of the limit sleeve. The bearing 11 is arranged in the bearing seat 13. An inner ring of the bearing 11 sleeves a top end of the ball screw 19. The loading assembly 21 includes a sealing gasket 24, a reaction frame 25, a universal pad 26, a base 27, a backlash ring 28, a lower chuck 29, a sample 30, an upper chuck 31, a dynamic sealing structure 32 and a loading rod 33. A top end of the loading rod 33 is connected to the power assembly, and a bottom end of the loading rod 33 extends into the liquid hydrogen containing mechanism 2 and is connected with the upper chuck 31. The dynamic sealing structure 32 is arranged between a middle part of the loading rod 33 and the liquid hydrogen containing mechanism 2. The reaction frame 25 is arranged below a top of and within the liquid hydrogen containing mechanism 2. A bottom of the reaction frame 25 is provided with a support plate. A bottom of the lower chuck 29 penetrates through the support plate and is connected with the base 27. The universal pad 26 is arranged between the base 27 and the bottom of the lower chuck 29. The backlash ring 28 is arranged between a top of the lower chuck 29 and an upper surface of the support plate. The sample 30 is arranged between the upper chuck 31 and the lower chuck 29.

The motor 9 provides power to drive the ball screw 19 to rotate through the speed reducer 10. The nut 17 moves up and down along the ball screw 19. The nut 17 drives the pull tube 15 to move up and down, so that the upper chuck 31 is driven to move up and down, as to apply tension or pressure on the sample 30.

The liquid hydrogen containing mechanism 2 is configured for providing a required experiment environment in the experiment. The liquid hydrogen containing mechanism 2 includes a cover plate 23, a liquid hydrogen channel 34, a heat preservation channel 35 and legs 37. The legs 37 are arranged at a bottom of the heat preservation channel 35. The liquid hydrogen channel 34 is arranged in the heat preservation channel 35. The liquid hydrogen channel 34 communicates with the liquid hydrogen tank 5. An accommodating space is formed between an outer wall of the liquid hydrogen channel 34 and an inner wall of the heat preservation channel 35. The accommodating space communicates with the liquid nitrogen tank 6 for containing the liquid nitrogen 36. The cover plate 23 is arranged at a top of the liquid hydrogen channel 34. The sealing gasket 24 is arranged between a bottom surface of the cover plate 23 and a top surface of the liquid hydrogen channel 34. The system also includes a thermostat 8. The cover plate 23 and the liquid hydrogen channel 34 are provided with cooling channels located around the sealing gasket 24. The thermostat 8 communicates with the cooling channels.

The liquid hydrogen channel 34 is filled with liquid hydrogen from the liquid hydrogen tank 5, so that the sample 30 can be tested in the liquid hydrogen environment. The liquid nitrogen 36 in the heat preservation channel 35 is configured for maintaining the temperature of the liquid hydrogen, so that the liquid hydrogen keeps at a low temperature, and hydrogen leakage is reduced. Since the temperature of liquid hydrogen and liquid nitrogen 36 is relatively low, the sealing gasket 24 is easy to failure so as to resulting in leakage in a low temperature environment. The cover plate 23 and the liquid hydrogen channel 34 are provided with cooling channels near the sealing gasket 24. Constant-temperature liquid is introduced into the cooling channels by the thermostat 8, so that the sealing gasket 24 is kept at a relatively high temperature, a sealing effect is ensured, and hydrogen leakage is avoided.

Even if hydrogen leaks, the jacket cover 4 can prevent hydrogen from entering the laboratory or atmospheric environment to prevent explosion or combustion, and the concentration of hydrogen is monitored by the hydrogen sensor 3. If necessary, the gas in the jacket cover 4 can be discharged to a specific environment.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, therefore, all changes, including the meanings and scopes of equivalent elements, of the claims are aimed to be included in the present disclosure, and any mark of attached figures in the claims should not be regarded as limitation to the involved claims.

Specific embodiments are used in this specification for illustration of the principles and implementations of the present disclosure. The description of the above embodiments is merely used to help understand the method and core concept of the present disclosure. In addition, those of ordinary skill in the art may make modifications to the specific implementations and application scope in accordance with the concept of the present disclosure. In conclusion, the content of this specification should not be construed as a limitation to the present disclosure.

What is claimed is:

1. A system for testing fatigue performance of material in low-temperature liquid hydrogen environment, comprising a jacket cover, wherein a hydrogen sensor is provided at a top of and within the jacket cover; a rack, a liquid hydrogen tank and a liquid nitrogen tank are provided in the jacket cover; a loading mechanism and a liquid hydrogen containing mechanism are provided on the rack, a top of the loading mechanism is connected to a top of the rack, and a bottom of the loading mechanism extends into the liquid hydrogen containing mechanism; the liquid hydrogen tank and the liquid nitrogen tank both communicate with the liquid hydrogen containing mechanism; the liquid hydrogen tank and the liquid nitrogen tank are respectively configured for providing liquid hydrogen and liquid nitrogen; and the loading mechanism is configured for providing tension or pressure to a sample.

2. The system for testing fatigue performance of material in low-temperature liquid hydrogen environment according to claim 1, wherein the rack comprises a bottom plate, an upright post, an upper stand and a middle stand; a bottom end of the upright post is connected to the bottom plate, the upper stand is arranged at a top of the upright post, and the middle stand is arrange at a middle or lower part of the upright post; and the loading mechanism is connected to the upper stand, and the liquid hydrogen containing mechanism is arranged on the middle stand.

3. The system for testing fatigue performance of material in low-temperature liquid hydrogen environment according to claim 1, wherein the loading mechanism comprises a power assembly and a loading assembly; the sample is arranged in the loading assembly; the power assembly is configured for driving the loading assembly; and the power assembly is connected to the rack.

4. The system for testing fatigue performance of material in low-temperature liquid hydrogen environment according to claim 3, wherein the power assembly comprises a motor, a speed reducer, a bearing, a pillar, a bearing seat, a support cylinder, a pull tube, a connecting shaft, a nut, a fastening screw, a ball screw and a shaft sleeve; an output shaft of the motor is connected to an input end of the speed reducer, and an output end of the speed reducer is connected to a top of the ball screw through the shaft sleeve; the pillar is arranged between a shell of the speed reducer and the top of the rack; the nut is arranged on the ball screw, a limit sleeve is arranged outside the nut, the limit sleeve is configured for preventing the nut from rotating without limiting an up-and-down movement of the nut, and the limit sleeve and the top of the rack are connected to each other through the fastening screw; the bearing seat is arranged at a top of the limit sleeve, the bearing is arranged in the bearing seat, and an inner ring of the bearing sleeves a top end of the ball screw.

5. The system for testing fatigue performance of material in low-temperature liquid hydrogen environment according to claim 3, wherein the loading assembly comprises a sealing gasket, a reaction frame, a universal pad, a base, a backlash ring, a lower chuck, a sample, an upper chuck, a dynamic sealing structure and a loading rod; a top end of the loading rod is connected to the power assembly, and a bottom end of the loading rod extends into the liquid hydrogen containing mechanism and is connected with the upper chuck; the dynamic sealing structure is arranged between a middle part of the loading rod and the liquid hydrogen containing mechanism; the reaction frame is arranged below a top of and within the liquid hydrogen containing mechanism, a bottom of the reaction frame is provided with a support plate, a bottom of the lower chuck penetrates through the support plate and is connected with the base, and the universal pad is arranged between the base and the bottom of the lower chuck; the backlash ring is arranged between a top of the lower chuck and an upper surface of the support plate; and the sample is arranged between the upper chuck and the lower chuck.

6. The system for testing fatigue performance of material in low-temperature liquid hydrogen environment according to claim 1, wherein the liquid hydrogen containing mechanism comprises a cover plate, a liquid hydrogen channel, a heat preservation channel and legs; the legs are arranged at a bottom of the heat preservation channel, the liquid hydrogen channel is arranged in the heat preservation channel, and the liquid hydrogen channel communicates with the liquid hydrogen tank; an accommodating space is formed between an outer wall of the liquid hydrogen channel and an inner wall of the heat preservation channel, and the accommodating space communicates with the liquid nitrogen tank for containing the liquid nitrogen; and the cover plate is arranged at a top of the liquid hydrogen channel.

7. The system for testing fatigue performance of material in low-temperature liquid hydrogen environment according to claim 6, wherein a sealing gasket is arranged between a bottom surface of the cover plate and a top surface of the liquid hydrogen channel.

8. The system for testing fatigue performance of material in low-temperature liquid hydrogen environment according to claim 7, further comprising a thermostat, wherein the cover plate and the liquid hydrogen channel are provided with cooling channels located around the sealing gasket, and the thermostat communicates with the cooling channels.

* * * * *